(12) United States Patent
Laps

(10) Patent No.: US 6,415,508 B1
(45) Date of Patent: Jul. 9, 2002

(54) HUB ASSEMBLY HAVING MINIMUM RUNOUT AND PROCESS FOR PRODUCING THE SAME

(75) Inventor: Larry D. Laps, Canton, OH (US)

(73) Assignee: The Timken Company, Canton, OH (US)

( * ) Notice: Subject to any disclaimer, the term of this patent is extended or adjusted under 35 U.S.C. 154(b) by 0 days.

(21) Appl. No.: 09/329,003

(22) Filed: Jun. 9, 1999

(51) Int. Cl.[7] .......................... B21D 53/26; B21K 1/40; B23B 5/04
(52) U.S. Cl. .......................... 29/894.362; 29/894.361; 29/894.36; 82/1.11; 82/112
(58) Field of Search ............... 29/450, 898.08, 29/898.09, 894.36, 894.361, 894.362; 82/1.11, 112; 188/18 A, 218 XL

(56) References Cited

U.S. PATENT DOCUMENTS

| | | |
|---|---|---|
| 1,407,834 A | 2/1922 | Bouillon |
| 2,395,586 A | 2/1946 | Scott |
| 2,663,975 A | 12/1953 | Barrett |
| 3,757,883 A | 9/1973 | Asberg |
| 4,042,422 A | 8/1977 | Asberg |
| 4,478,116 A | 10/1984 | Fuller |
| 4,874,064 A | 10/1989 | Oono |
| 4,959,902 A * | 10/1990 | Hamilton ................. 29/898.07 |
| 5,022,659 A | 6/1991 | Otto |
| 5,430,926 A * | 7/1995 | Hartford .................. 29/898.04 |
| 5,816,711 A | 10/1998 | Gingrich |
| 5,842,388 A * | 12/1998 | Visser et al. .................. 82/1.11 |
| 5,915,502 A * | 6/1999 | Rapisardi et al. ............. 82/1.11 |
| 5,988,324 A * | 11/1999 | Bertetti et al. ............. 188/18 A |
| 6,071,180 A * | 6/2000 | Becker |
| 6,158,124 A * | 12/2000 | Austin ..................... 29/898.09 |
| 6,212,981 B1 * | 5/2001 | Brinker et al. ............... 82/1.11 |

FOREIGN PATENT DOCUMENTS

| | | |
|---|---|---|
| WO | WO 98/38436 | 9/1998 |
| WO | WO 98/58762 | 12/1998 |

* cited by examiner

*Primary Examiner*—S. Thomas Hughes
*Assistant Examiner*—Eric Compton
(74) *Attorney, Agent, or Firm*—Polster, Lieder Woodruff & Lucchesi

(57) ABSTRACT

An automotive hub assembly, which carries a brake disk, has a hub provided with a spindle which rotates in a housing on a double row antifriction bearing having its raceways oriented obliquely to the axis of rotation so that the bearing accommodates both radial and axial loads. The bearing is set to a condition of preload so no free motion exists in it. The hub also has a flange at one end of its spindle, and the flange is machined on its face that is presented away from the housing to provide a machined mounting surface against which the brake disk is installed. The machining occurs after the hub assembly is assembled. To this end, the housing of the hub assembly is held fast while the hub is rotated on the bearing. With the hub rotating, a cutting tool is moved across the face of the flange, and it produces the machined mounting surface which is perpendicular to the axis of the bearing. The machined mounting surface has essentially no runout, so that the brake disk acquires no runout from the hub assembly.

13 Claims, 3 Drawing Sheets

HUB ASSEMBLY HAVING MINIMUM RUNOUT AND PROCESS FOR PRODUCING THE SAME

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention relates in general to hub assemblies, and more particularly to a hub assemblies with surfaces that rotate with essentially no runout and a process for producing the same.

Most passenger automobiles and light trucks of current manufacture come equipped with disk brakes, at least at the front wheels of such vehicles. Disk brakes weigh less than drum brakes, which they have to a large measure replaced, are less expensive to manufacture, are easier to service, and provide more effective braking. But disk brakes will produce annoying pulsations, known as "brake judder", if improperly manufactured or maintained.

The typical disk brake for a vehicle has a disk which rotates with a road wheel of the vehicle and a caliper which clamps down on the disk when the brakes of the vehicle are applied. Indeed, the caliper has pads which bear against machined surfaces on two sides of the disk, with the friction between the pads and the machined surfaces providing the braking. The machined surfaces must be perfectly flat, and must rotate without runout (wobble), lest brake judder will develop when the brakes are applied.

Various arrangements exist for mounting the road wheels—and the brake disks as well—on the suspension systems of the vehicles. In one the road wheel and brake disk for that wheel are bolted to a hub having a spindle which rotates in an antifriction bearing which in turn is fitted to a housing. The housing is attached to a steering knuckle or other component if the vehicle's suspension system. The disk, being a separate and relatively simple component is easily machined to close tolerances along its critical surfaces. But that surface of the hub against which the brake disk is installed does not lend itself to the same precision. To be sure, it is machined, but the machining occurs before assembly, so the bearing on which the hub rotates and the surface on which it is mounted can all contribute to runout in the surface against which the brake disk is installed. This runout transfers to the brake disk itself.

BRIEF SUMMARY OF THE INVENTION

The present invention resides in a process for providing the rotating hub of a hub assembly with a mounting surface that is essentially free of runout, so that a brake disk installed against that surface will not acquire runout from the hub assembly. The hub has a spindle which rotates on a bearing in a housing, both of which also form part of the hub assembly. At one end of the spindle the hub has a flange provided with a face which is presented away from the housing. That face is machined while the housing is held fast and the hub is rotated on the bearing, and as a consequence the face, which is the mounting surface, rotates with essentially no runout. The invention also resides in a process for assembling a hub assembly and also in the hub assembly itself.

DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
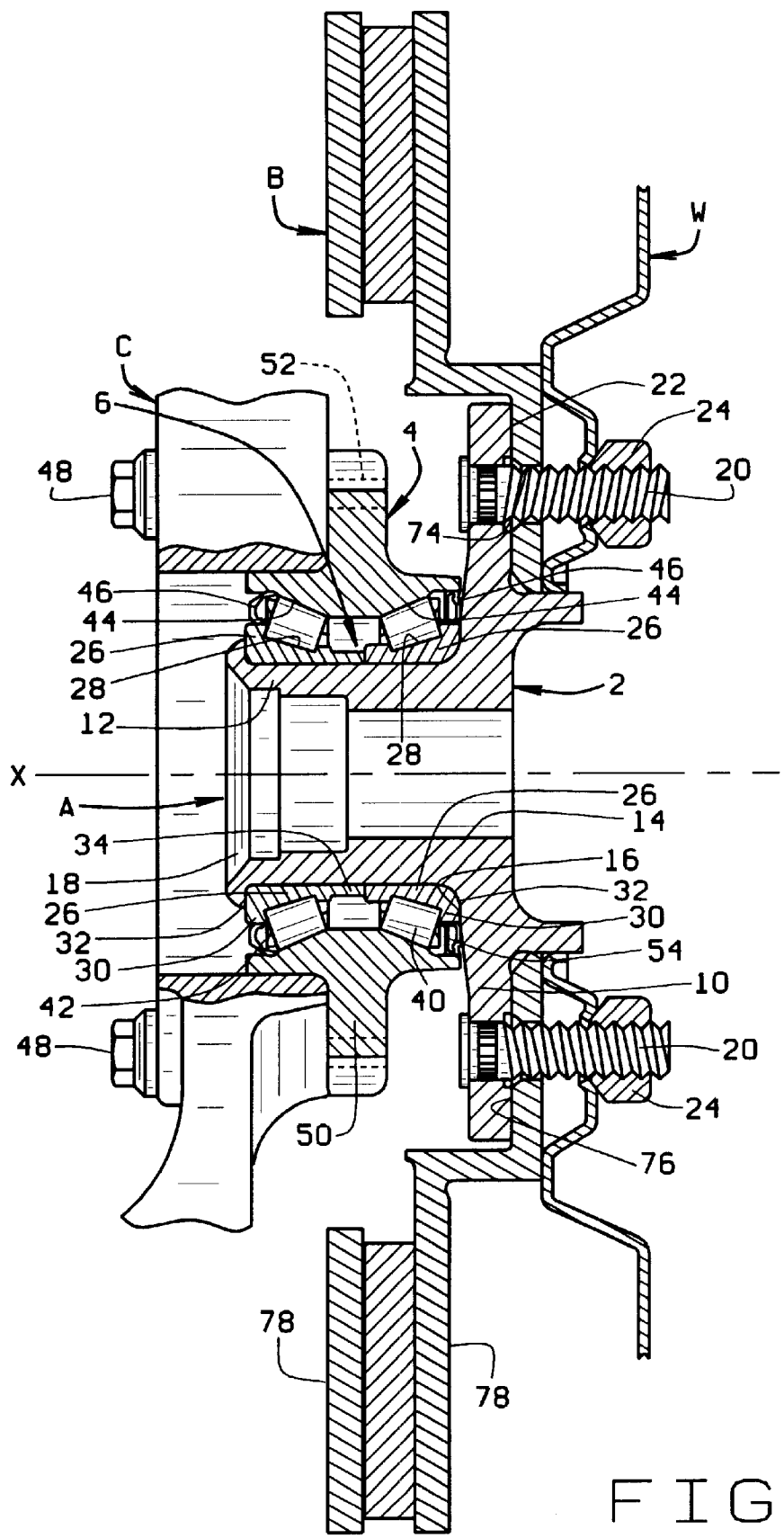
FIG. 1 is a sectional view of a hub assembly constructed in accordance with and embodying the present invention, with the hub assembly being fitted to a steering knuckle and having a brake disk and road wheel mounted on it.

Referring now to the drawings (FIG. 1), a hub assembly A is mounted on a component C of the suspension system for an automotive vehicle and enables a road wheel W to rotate relative to the component C about an axis X of rotation. Not only does the hub assembly A have the road wheel W attached to it, it also carries a brake disk B which likewise revolves about the axis X. Indeed, the disk B rotates with essentially no runout at its critical friction surfaces, to a large measure this being a consequence of a machining procedure used during the manufacture of the hub assembly A.

Considering the hub assembly A first, it includes (FIG. 1) a hub 2, a housing 4, and a bearing 6 which enables the hub 2 to rotate relative to the housing 4 about the axis X with relatively little friction. The road wheel W and brake disk B are attached to the hub 2, while the housing 4 is secured firmly against the component C of the vehicle suspension system. The component C may be a steering knuckle.

The hub 2 has (FIG. 1) a flange 10 and a spindle 12 which projects from one face of the flange 10. Actually spindle 12, which contains a through bore 14, emerges from a shoulder 16 located along the inside face of the flange 10 and terminates at an outwardly directed formed end 18 located at its opposite end. Radially beyond the spindle 12 the flange 10 contains threaded studs 20 which project axially from its other face. That face is machined to provide a mounting surface 22 against which the brake disk B fits, and indeed the disk B takes its orientation from the surface 22. The disk B fits over the studs 20 as does the road wheel W, and lug nuts 24 thread over the studs 20 to secure the brake disk B and road wheel W firmly to the hub 2.

The bearing 6 includes (FIG. 1) an inner race in the form of two cones 26 which fit around the spindle 12 where they are captured between the shoulder 16 and the formed end 18, there being an interference fit between each cone 26 and the spindle 12. Each cone 26 has a tapered raceway 28 that is presented outwardly away from the axis X, a thrust rib 30 at the large end of its raceway 28, and a back face 32, which is squared off with respect to the axis X, on the end of the thrust rib 30. The inboard cone 26 is somewhat longer than the outboard cone 26 by reason of having a cylindrical cone extension 34 which projects beyond the small end of its raceway 28. The inboard cone 26 at its cone extension 34 abuts the small end of the outboard cone 26 along the spindle 12, that is to say, the two cones 26 abut at their front faces. The back face 32 of the outboard cone 26 abuts the shoulder 16 that lies along the flange 10. The formed end 18 turns outwardly over and against the back face 32 of the inboard cone 26 and serves to capture the two cones 26 on the spindle 12.

In addition to the cones 26, the bearing 6 includes (FIG. 1) tapered rollers 40, arranged in two rows, there being a separate row around each cone 26. Actually, the rollers 40 extend around the raceways 28 for the cones 26, there being essentially line contact between the tapered side faces of the rollers 40 and the raceways 2 large end faces of the rollers 40 bear against the thrust ribs 30. The rollers 40 of each row are essentially on apex, which means that the envelopes in which their tapered side faces lie have their apices located at a common point along the axis X. Each row of rollers 40 has a cage 42 to maintain the proper spacing between the rollers 40 in that row.

The ring-like housing 4 surrounds the spindle 12 as well as the two cones 26 and the two rows of rollers 40 (FIG. 1). It forms part of the bearing 6 in that it has tapered raceways 44 which are presented inwardly toward the axis X. Indeed, the housing 4 constitutes the outer race of the bearing 6. The raceways 44 on the housing 4 taper downwardly toward an intervening surface which separates them. The rollers 40 likewise lie along the raceways 44 of the housing 4, there being essentially line contact between the raceways 44 and the tapered side faces of the rollers 40. At their large ends, the raceways 44 open into short end bores 46 in which the thrust ribs 30 of the two cones 26 are located.

Generally midway between its ends, the housing 4 has a triangular or rectangular flange 50 which fits against the component C of the suspension system for the vehicle. Here the housing 4 is secured firmly to the suspension system component C with bolts 48 that engage threaded holes 52 located in the lobes of the flange 50.

The end bores 46 in the housing 4 contain closures 54 which fit around the thrust ribs 30 on the cones 26 to establish fluid barriers at the ends of the housing 4.

These barriers isolate the rollers 40 and the raceways 28 and 44 from road contaminants, such as water, ice-melting salts and dirt. U.S. Pat. Nos. 5,022,659 and 5,816,711 disclose suitable closures.

The formed end 18 unitizes the hub assembly A. But the hub 2 does not always have the formed end 18. Initially, the spindle 12 of the hub 2 extends from the shoulder 16 all the way to its end as a cylindrical surface. The two cones 26 with their complement of rollers 40 and the housing 4 captured between the rollers 40 of the two rows are installed over the cylindrical surface of the spindle 12 and advanced until the back face 32 of the outboard cone 26 comes against the shoulder 16 at the other end of the spindle 12. A portion of the spindle 12 projects beyond the back face 32 of the inboard cone 26. This portion is deformed into the formed end 18. PCT application GB 98/01823 (International Publication No. WO98/58762), discloses a rotary forming process for upsetting the initially extended end of the spindle 12 and converting that end into the formed end 18 which captures the cones 26 on the spindle 12 and in effect unitizes the entire hub assembly A.

Other means may secure the two cones 26 on the spindle 12 as well. For example, the end of the spindle 12 may have threads and a nut engaged with those threads and turned down against the back face 32 of the inboard cone 26. Also, the end of the spindle 12 may have a groove and a snap ring fitted to the groove.

When the hub assembly A is so unitized, its bearing 6 exists in a condition of slight preload. Actually the spacing between the inner raceways 34 on the cones 26 determines the setting of the bearing 6, and that spacing depends on the length of the cone extension 34 for the inboard cone 26, inasmuch as the rotary forming procedure which produces the formed end 18 drives the inboard cone 26 toward the outboard cone 26 with enough force to cause the cone extension 34 on the former to abut the small end of the latter. Since the bearing 6 is set to a condition of preload and interference fits exist between its cones 26 and the spindle 12, the hub A rotates within the housing 4 without any radial or axial free motion. As a consequence, the axis X remains stable.

Figure 2:
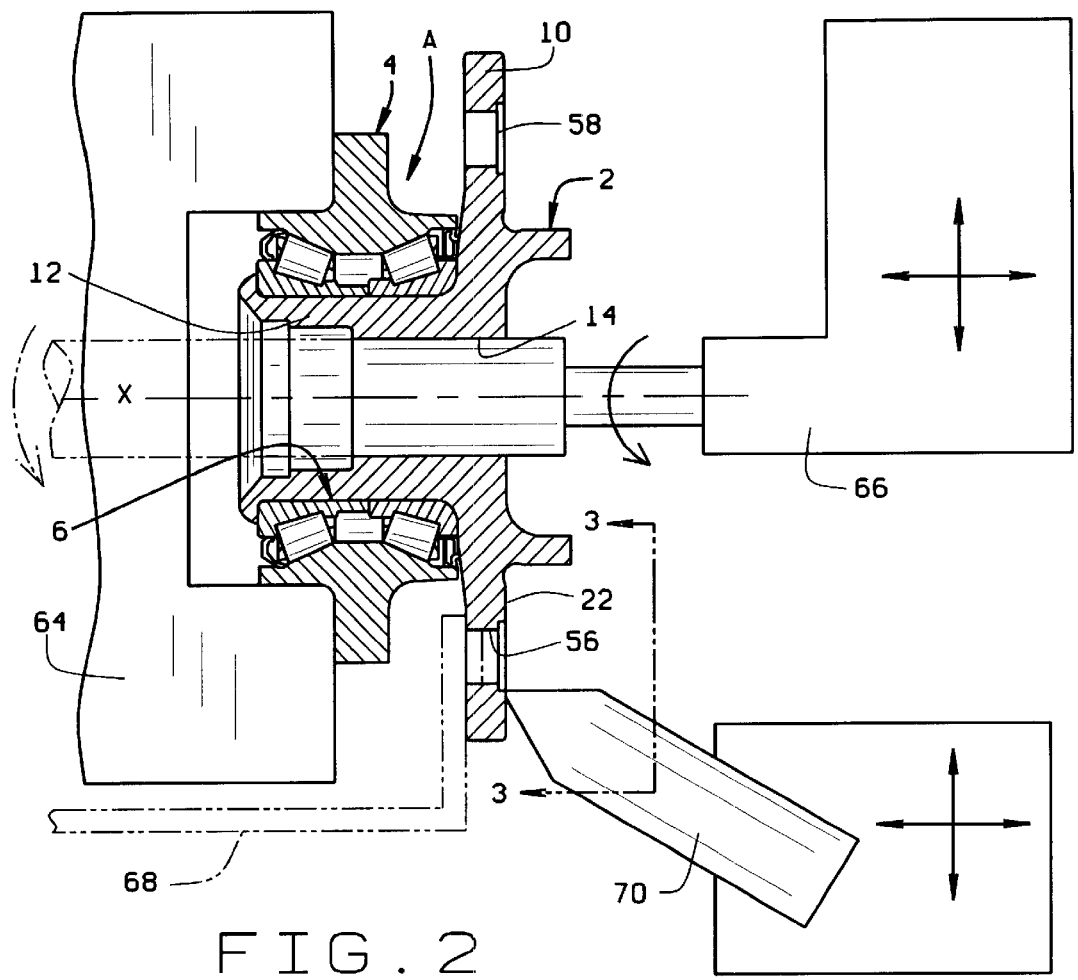
FIG. 2 is a sectional view of the hub assembly showing the mounting surface of the flange on its hub being machined before threaded studs are fitted to the flange.
Figure 3:
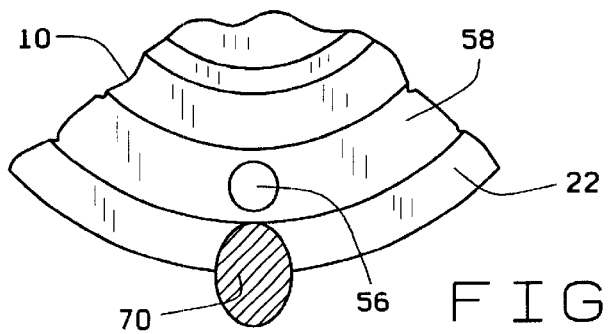
FIG. 3 is a partial end view of the mounting surface on the flange of the hub.

Only after the hub assembly A is unitized with its bearing 6 set in preload, is the outboard face of the flange 10 for the hub 2 machined to provide the mounting surface 22. But the machining occurs before the threaded studs 20 are installed in the flange 10. Indeed, before the machining and likewise before the installation of the bearing 6 and housing 4 on the hub 4, the flange 10 of the hub 4 is provided with holes 56 for receiving the studs 20 and a shallow annular relief 58 at the holes 56 (FIGS. 2 and 3). The relief 58 opens away from the housing 4 and extends circumferentially along the flange 10 without interruption. The holes 56 open into the relief 58.

To machine the outboard face of the flange 10 in order to produce the machined mounting surface 22, the housing 4 is inserted into and clamped within a stationary chuck 64 so that the housing 4 remains in a fixed position (FIG. 2). Next, the hub 2 is engaged with a rotary drive 66. The engagement may occur within the bore 14 of spindle 12 and from either end of the bore 14 (access from one end shown in full lines in FIG. 2, access from the other end shown in interrupted lines). This type of engagement is particularly suitable when the bore 14 contains a spline as it will if the hub 2 is to be coupled to the drive train of the vehicle so that the road wheel W actually propels the vehicle. On the other hand, the drive 66 may include a dog 68 (shown in interrupted lines in FIG. 2) which engages the flange 10 at one of its holes 56, all without obstructing the outboard face of the flange 10. The rotary drive 66 turns the hub 4, causing it to rotate about the axis X. The axis X remains stable because the chuck 64 firmly grips the housing 4 and the bearing 6 operates in preload. With the hub 4 rotating, a cutting or facing tool 70 is advanced generally radially across the outboard face of the flange 10. The facing tool 70 removes metal from the flange 10, both radially outwardly and radially inwardly from the relief 58, and produces the machined mounting surface 22. That surface 22 is slightly conical and concave, it projecting farthest at the periphery of the flange 10. A rotating grinding wheel may be run over the machined surface 22 to improve its finish and precision.

The mounting surface 22 on the flange 10 fixes the orientation of the brake disk B with respect to the axis X. In this regard the brake disk B contains (FIG. 1) holes 74 which are arranged in the pattern of the studs 20 and are only slightly larger than the threaded shanks of the studs 20, so that the brake disk B fits over the studs 20. Indeed, the disk B in the region of its holes 74 has a machined reference surface 76 which is planar. The machined reference surface 76 of the disk B initially abuts the machined mounting surface 22 on the flange 10 of the hub 4 at the periphery of the mounting surface 22 owing to the concarity of the surface 22. But the nuts 24, when turned down, draw the reference surface 76 of the disk B against the mounting surface 22, and insure that the reference surface 76 seats firmly against the mounting surface 22 at the periphery of the latter. The disk B also has two machined friction surfaces 78 that lie outwardly from the reference surface 76. The friction surfaces 78 occupy planes that are generally perpendicular to the axis X. All three surfaces 76 and 78 are machined with precision.

The brake disk B is relatively small and its reference surface 76 and friction surfaces 78 can be machined with relative ease and with considerable precision. The lug nuts 24 secure the brake disk B firmly to the hub 2 of the hub assembly A with the reference surface 76 of the brake disk B firmly abutting the mounting surface 22 on the flange 10 of the hub 4. As a consequence, the brake disk B rotates relative to the housing 4 with essentially no runout at the friction surfaces 78.

Figure 4:
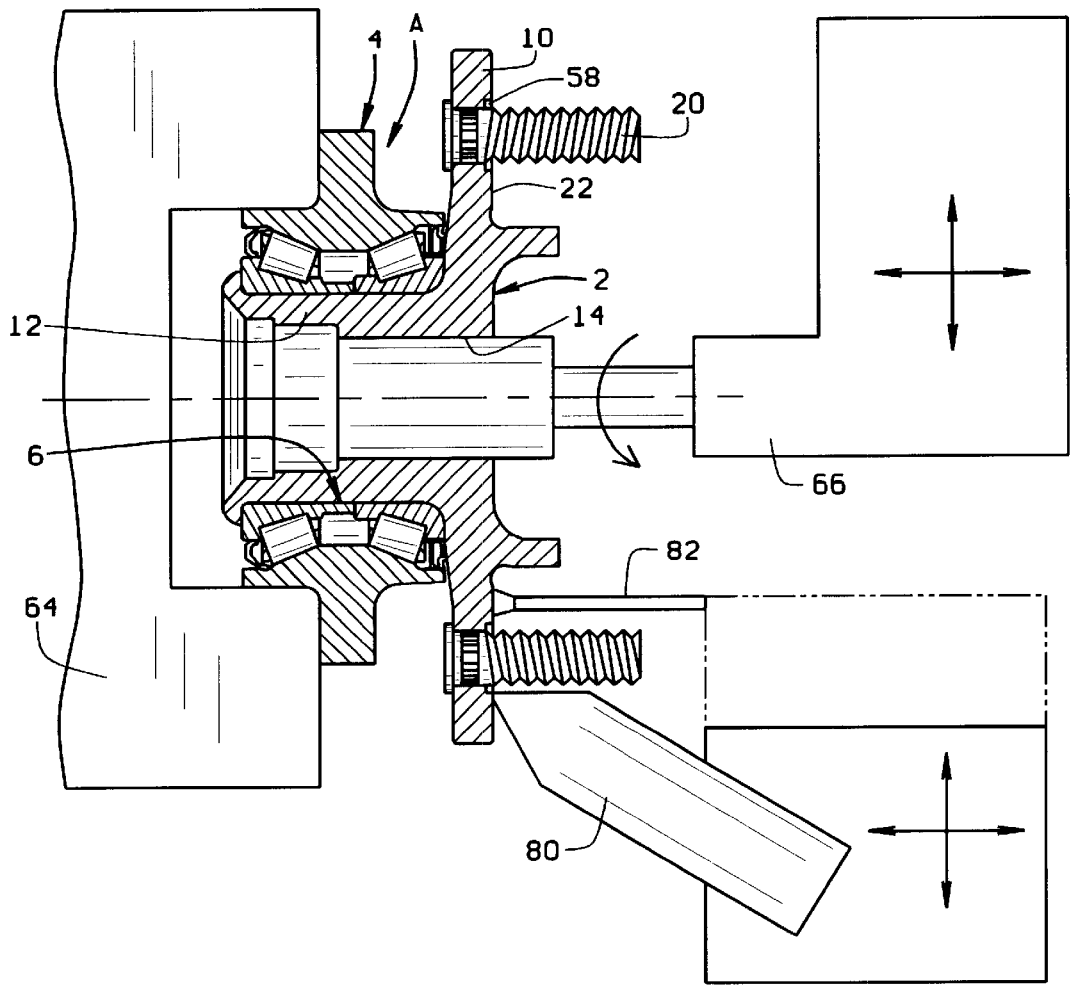
FIG. 4 is a sectional view of the hub assembly showing the mounting surface on the flange of its hub being machined while the studs are in the flange.

The outboard face of the flange 10 on the hub 2 may also be machined while the threaded studs 20 are in the flange 10 (FIG. 4). This requires two facing tools 80 and 82, the former being located radially outside of the shallow relief 58 and the latter being located within the relief 58. The tool 80 moves inwardly from the periphery of the flange 10 and produces that region of the machined mounting surface 22 that lies radially outwardly from the relief 58. The tool 82 moves inwardly from the shallow relief 58 and produces that region of the machined mounting surface 22 that lies radially inwardly from the shallow relief 58.

This invention is intended to cover all changes and modifications of the example of the invention herein chosen for purposes of the disclosure which do not constitute departures from the spirit and scope of the invention.

What is claimed is:

1. A process for rendering a hub assembly more suitable for accepting a brake disk having friction surfaces, the hub assembly including a hub having a spindle and a flange at one end of the spindle, a housing around the spindle of the hub and generally behind the flange, and an antifriction bearing located between the spindle and the housing and establishing an axis of rotation for the hub; said process comprising: holding the housing fast; rotating the hub on the bearing while the housing is held, with the rotation being about the axis of the bearing; while the hub rotates, machining the face of the flange that is presented away from the housing to provide a mounting surface against which the brake disk may be installed; and mounting the brake disk on the machined flange.

2. The process according to claim 1 wherein machining includes moving a cutting tool over the face of the flange.

3. The process according to claim 1 wherein the bearing has rolling elements organized in two rows and raceways along which the rolling elements roll, with the raceways being oblique to the axis and oriented such that the bearing transfers between the housing and spindle radial loads as well as thrust loads in both axial directions.

4. The process according to claim 3 wherein the bearing is in preload, whereby no radial or axial play exists within it.

5. The process according to claim 1 wherein the flange has holes that extend axially through it; and wherein the process further comprises installing threaded studs in the holes after the mounting surface is provided.

6. A process for rendering a hub assembly more suitable for accepting a brake disk having friction surfaces, the hub assembly including a hub having a spindle and a flange at one end of the spindle, a housing around the spindle of the hub and generally behind the flange, and an antifriction bearing located between the spindle and the housing and establishing an axis of rotation for the hub, the flange of the hub having an annular relief that extends circumferentially around the axis and opens out of the face of the flange that is presented away from the housing, the flange further having holes which extend axially through it and open out of the annular relief; said process comprising: holding the housing fast; rotating the hub on the bearing while the housing is held, with the rotation being about the axis of the bearing; while the hub rotates, machining the face of the flange that is presented away from the housing by advancing a cutting tool over the face of the flange both inside and outside the annular relief so as to provide a mounting surface against which the brake disk may be installed.

7. The process according to claim 6 and further comprising installing threaded studs in the holes in the flange.

8. The process according to claim 7 wherein the cutting tool is advanced across the flange after the threaded studs are installed in the holes.

9. The process according to claim 8 wherein the step of machining the face of the flange comprises advancing a first cutting tool across the flange between the periphery of the flange and the annular relief and advancing a second cutting tool across the flange between the annular relief and the axis.

10. A process for manufacturing an automotive hub assembly, said process comprising: installing a housing and an antifriction bearing over a spindle on a hub that also includes a flange which is attached to one end of the spindle, all such that the flange is located in front of the housing, the bearing having rolling elements organized in two rows and raceways along which the rolling elements roll, with the raceways being oblique to the axis and oriented such that the bearing will transfer between the housing and the spindle radial loads as well as thrust loads in both axial directions, the flange of the hub having an annular relief which extends circumferentially around the axis and opens out of the face of the flange that is presented away from the housing, the flange also having holes which extend axially through it and open into the relief; installing threaded studs in the holes of the flange such that they project beyond the face of the flange that is presented away from the housing; capturing the bearing on the spindle, with the bearing being in preload so that no axial or radial free motion exists between the housing and the hub; holding the housing in a fixed position; rotating the hub about the axis of the bearing; and while the hub is rotating, machining a face of its flange.

11. The process according to claim 10 wherein the step of machining the face of the flange occurs before the threaded studs are installed in the flange and comprises advancing a cutting tool across the face of the flange that is presented away from the housing.

12. The process according to claim 10 wherein the step of machining the face of the flange occurs after the threaded studs are installed in the flange and comprises advancing a first cutting tool over the face of the flange that is located radially outwardly from the annular relief and advancing a second cutting tool over the face of the flange that is located radially inwardly from the relief.

13. A process for manufacturing an automotive hub assembly, said process comprising: installing a housing and an antifriction bearing over a spindle on a hub that also includes a flange which is attached to one end of the spindle, all such that the flange is located in front of the housing, the bearing having rolling elements organized in two rows and raceways along which the rolling elements roll, with the raceways being oblique to the axis and oriented such that the bearing will transfer between the housing and the spindle radial loads as well as thrust loads in both axial directions, the flange of the hub having holes which extend axially through it; installing threaded studs in the holes of the flange such that they project beyond the face of the flange that is presented away from the housing; capturing the bearing on the spindle, with the bearing being in preload so that no axial or radial free motion exists between the housing and the hub; holding the housing in a fixed position; rotating the hub about the axis of the bearing; and while the hub is rotating, machining a face of its flange to provide a mounting surface for the brake disk; and installing the brake disk over the thread studs and against the machined mounting surface of the flange of the hub, the brake disk having a machined reference surface that is against the machined mounting surface of the flange and machined friction surfaces that are located radially outwardly from the reference surface.

* * * * *